United States Patent [19]

Marusue

[11] Patent Number: 5,131,298
[45] Date of Patent: Jul. 21, 1992

[54] METHOD FOR CONTROLLING SHIFT OF AN AUTOMATIC TRANSMISSION AND SHIFT CONTROL SYSTEM THEREFOR

[75] Inventor: Toshihisa Marusue, Hiroshima, Japan

[73] Assignee: Mazda Motor Corporation, Hiroshima, Japan

[21] Appl. No.: 687,345

[22] Filed: Apr. 18, 1991

[30] Foreign Application Priority Data

Apr. 20, 1990 [JP] Japan ................................. 1-104934

[51] Int. Cl.⁵ ............................................ B60K 41/18
[52] U.S. Cl. ........................................................ 74/866
[58] Field of Search ............................................ 74/866

[56] References Cited

U.S. PATENT DOCUMENTS

| | | | |
|---|---|---|---|
| 4,685,356 | 8/1987 | Iwatsuki | 74/866 |
| 4,688,449 | 8/1987 | Harada et al. | 74/866 X |
| 4,730,519 | 3/1988 | Nakamura et al. | 74/866 |
| 4,945,482 | 7/1990 | Nishikawa et al. | 74/866 X |
| 4,984,483 | 1/1991 | Hiramatsu et al. | 74/866 |
| 4,991,465 | 2/1991 | Hurth | 74/866 |
| 5,014,575 | 5/1991 | Fujiwara et al. | 74/866 |

Primary Examiner—Rodney H. Bonck
Assistant Examiner—Ryan W. Massey
Attorney, Agent, or Firm—Fish & Richardson

[57] ABSTRACT

An automatic transmission has a sub-transmission and a main transmission disposed on the engine side and on the driven wheel side in series. The sub-transmission and the main transmission are each comprised of a planetary gear mechanism so as to allow the sub-transmission to assume two speed range modes including low and high speed ranges and the main transmission to assume three speed range modes including low, intermediate and high speed ranges. When the automatic transmission is downshifted from the fifth to the third speed range mode, both of the sub-transmission and the main transmission are downshifted. In this case, the sub-transmission is downshifted from the high speed range to the low speed range. While the main transmission is downshifted from the high speed range to the intermediate speed range. In the downshifting from the fifth to the third speed range, a gear ratio of the sub-transmission between prior to and subsequent to the shift is set to be smaller than that of the main transmission. When the sub-transmission and the main transmission are both shifted in the same direction, the transmission having a smaller gear ratio is delayed.

20 Claims, 7 Drawing Sheets

METHOD FOR CONTROLLING SHIFT OF AN AUTOMATIC TRANSMISSION AND SHIFT CONTROL SYSTEM THEREFOR

BACKGROUND OF THE INVENTION

1. Field of the Invention

The present invention relates to a method for controlling a shift of an automatic transmission and a shift control system therefor and, more particularly, to a method for controlling a shift of an automatic transmission of an automotive vehicle and a shift control system therefor, in which plural shift mechanisms to be automatically shifted are disposed sequentially and a shift in such a multistage as forward five speed range positions can be realized.

2. Description of Related Art

Japanese Patent Laid-open Publication (kokai) No. 4,950/1987 discloses an automatic transmission in which two shift mechanisms are disposed sequentially and a shift in a multistage is realized by a combination of a multistage speed range achieved by a first shift mechanism with a multistage speed range achieved by a second shift mechanism. More specifically, if the first shift mechanism would have two forward speed range modes and the second shift mechanism would have three forward shift speed range modes, a combination between the first and second shift mechanisms can realize five forward shift speed range modes. This prior patent publication describes such a method of controlling a shift of the automatic transmission as finishing the shift of the two shift mechanisms at the same time when one of the two shift mechanism is being downshifted while the other is being upshifted, thereby reducing a shift shock due to compensating the deceleration accompanied with the shifting by one of the shift mechanisms for the acceleration accompanied with the shifting by the other thereof.

It can be noted, however, that such an automatic transmission having two shift mechanisms as disclosed in the prior patent publication may amplify changes in a vehicle speed accompanied with a shift to be conducted by each shift mechanism. In other words, when the two shift mechanisms are shifted in one direction. In other words, when both of the shift mechanisms are downshifted or upshifted, the changes in the vehicle speed of the automotive vehicle may be amplified in conjunction with the shift to be made by the two shift mechanisms, thereby making a shift shock larger.

SUMMARY OF THE INVENTION

The present invention has the object to provide a method for controlling a shift of the automatic transmission for an automotive vehicle, having a plurality of shift mechanisms disposed sequentially, in which a shift shock can be eliminated or reduced, which may occur when at least two of the plural shift mechanisms are shifted in the identical directions.

The present invention has another object to provide a shift control system suitable for the method for controlling the shift of the automatic transmission of the automotive vehicle.

In order to achieve the aforesaid invention, the present invention in one aspect consists of a method for controlling a shift of an automatic transmission for an automotive vehicle having a plurality of shift mechanisms disposed sequentially for realizing a speed range mode in a multistage by appropriately combining the plurality of the shift mechanisms, wherein:

When at least two shift mechanisms are both downshifted or upshifted, a timing for finishing downshifting or upshifting of one shift mechanism of the two shift mechanisms is delayed from a timing for finishing downshifting or upshifting of the other shift mechanism thereof.

In another aspect, the present invention consists of a shift control system for an automatic transmission of an automotive vehicle having a plurality of shift mechanisms so disposed sequentially as to realize a speed range mode of a multistage by appropriately combining the plurality of the shift mechanisms, comprising:

means for detecting an identical direction in which at least two shift mechanisms out of the plurality of the shift mechanisms are both downshifted or upshifted; and means for delaying a timing for finishing a shift of one shift mechanism from a timing for finishing downshifting or upshifting of the other shift mechanism in response to a signal from the means for detecting the identical direction, when the at least two shift mechanism are both downshifted or upshifted in the identical directions.

With the arrangements as described hereinabove, the present invention can minimize a shift shock, as compared with conventional method and system in which the two shifts to be conducted by the two shift mechanisms are simultaneously finished when at least two shift mechanisms are both upshifted or downshifted at the same time, because in the embodiment according to the present invention a change in a vehicle speed accompanied with only one shift mechanism is taken into account immediately before the finish of the shift of the automatic transmission.

It is to be noted as preferable that the shift mechanism having a smaller gear ratio between prior to the shift and subsequent to the shift is delayed in its timing for finishing the shift than the other shift mechanism having a larger gear ratio therebetween, when at least two shift mechanisms are both downshifted or upshifted. In other words, if a change in the gear ratio would be small, the change of a vehicle speed accompanied with this shift should become small. Hence, a rate of the change in the rotational number at the final stage of the shift can be rendered small with respect to the automatic transmission as a whole by delaying the timing for finishing the shift of the shift mechanism having a smaller change in the vehicle speed accompanied with the shift.

Other objects, features and advantages of the present invention will become apparent in the course of the description of the preferred embodiments, which follows, in conjunction with the accompanying drawings.

DESCRIPTION OF THE PREFERRED EMBODIMENTS

The present invention will be described more in detail by way of examples with reference to the accompanying documents.

Figure 2:
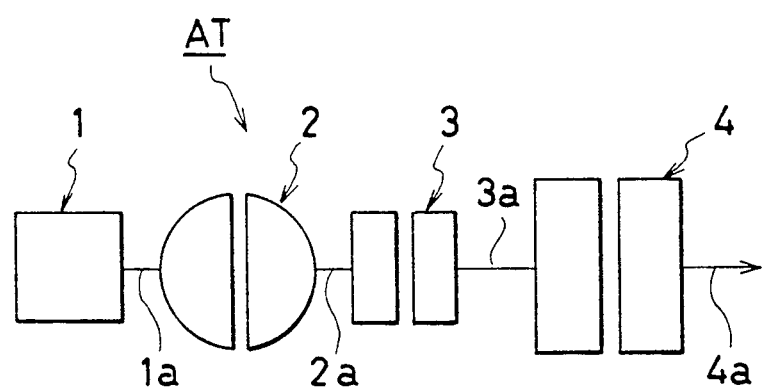
FIG. 2 is a diagrammatic representation showing an outline of an automatic transmission according to the embodiment of the present invention.

Referring to FIG. 2, reference numeral 1 denotes a combustion engine and output of the combustion engine 1 is transmitted through an automatic transmission AT to driven wheels. The automatic transmission AT comprises a torque converter 2, a sub-transmission 3 and a main transmission 4, which are disposed in this order from the engine side.

Figure 3:
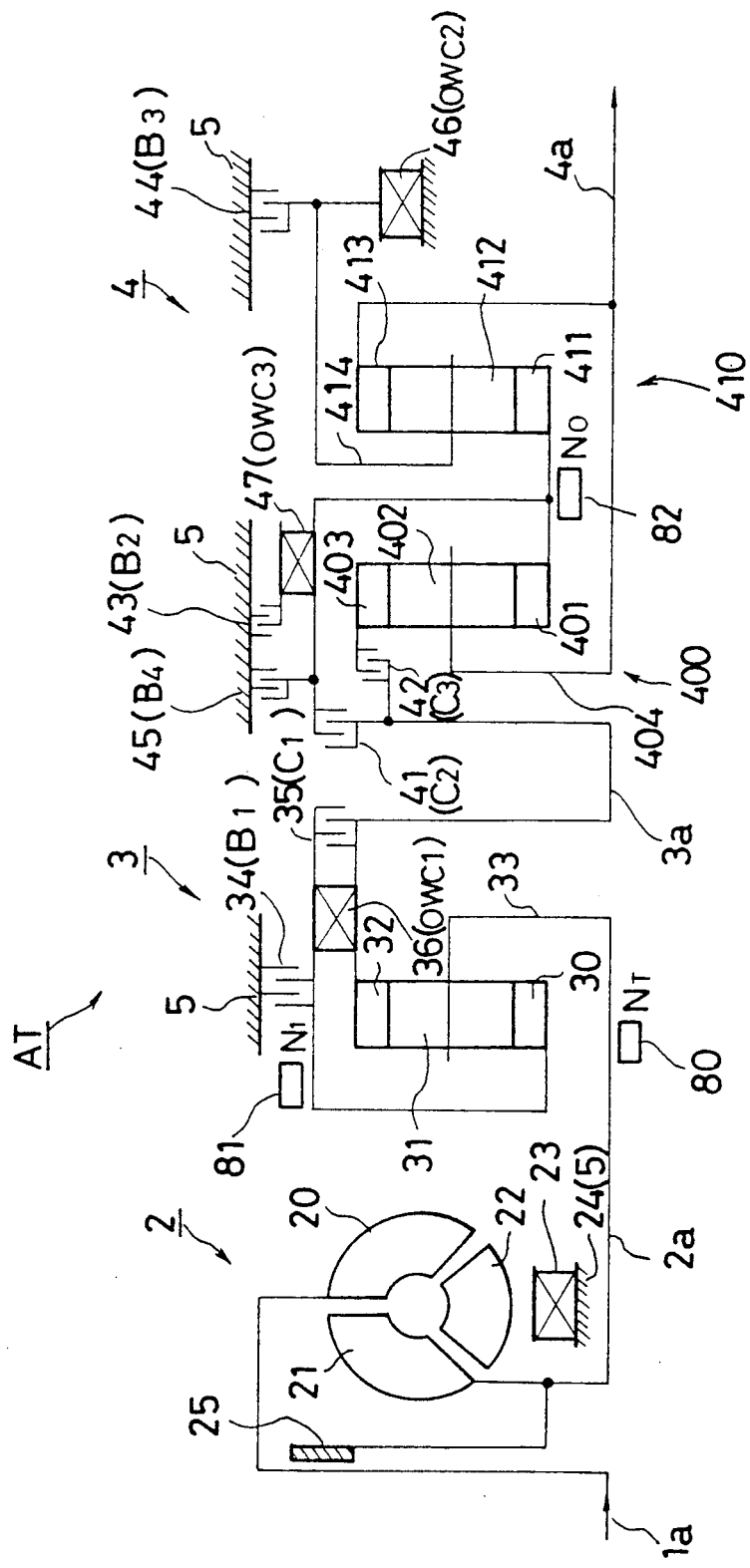
FIG. 3 is a diagrammatic representation showing an outline of the shift mechanisms contained in the automatic transmission according to the embodiment of the present invention.

As shown in FIG. 3, the torque converter 2 comprises a pump 20 connected to an output shaft 1a of the combustion engine 1, a turbine 21 disposed to correspond to the pump 20, and a stator 22 interposed between the turbine 21 and the pump 20. The stator 22 is so disposed as to rotate through a one-way clutch 23 on a fixed shaft 24 and as to be identical with a casing 5 of the automatic transmission AT. The one-way clutch 23 allows rotation of the stator 22 in the same direction as the pump 20, while inhibiting the rotation thereof in the opposite direction.

To the turbine 21 is connected an output shaft 2a of the torque converter 2, and a lockup clutch 25 is connected at its one end to the output shaft 2a of the torque converter 2 and at its other end to the pump 20. The lockup clutch 25 is biased in the direction of always coupling the clutch (in the lockup direction) by the hydraulic pressure of operating oil circulating within the torque converter 2, while allowing the output shaft 1a of the combustion engine 1 to be connected directly to the output shaft 2a of the torque converter 2 by keeping its open state by the hydraulic oil pressure to be fed from the outside and draining the oil pressure. The torque converter 2 of this kind is per se known so that further description will be omitted from this specification.

The sub-transmission 3 comprises a planetary unit consisting of three gear elements containing a sun gear 30, a pinion gear 31 and a ring gear 32 as well as a planetary carrier 33 which is connected to the output shaft 2a of the torque converter 2.

The sun gear 30 is secured by a first brake 34 (B1) disposed to the casing 5 of the automatic transmission AT, and output is transmitted to an output shaft 3a from the sun gear 30 through a first clutch 35 (C1) when the coupling of the first brake 34 is released. On the other hand, the ring gear 32 is connected to the output shaft 3a, and the output to be transmitted to the output shaft 3a from the output shaft 1a of the combustion engine 1 is so upshifted or downshifted as to switch two modes, one mode being such that it is transmitted from the output shaft 1a thereof to the output shaft 3a through the ring gear 32 and the other mode being such that it is transmitted from the output shaft 1a thereof to the output shaft 3a through the sun gear 30.

In other words, the output from the output shaft 1a of the combustion engine 1 is transmitted to the output shaft 3a through the sun gear 30 when the first clutch 35 working as a friction element of the sub-transmission 3 is brought into a coupled state and the first brake 34 is brought into an uncoupled or released state. In this state, the sub-transmission 3 assumes a low speed range mode. On the other hand, the output therefrom is transmitted to the output shaft 3a through the ring gear 32 when the first clutch 35 is brought into an uncoupled (released) state while the first brake is brought into a coupled state. In this state, the sub-transmission 3 assumes a high speed range mode. In FIG. 3, reference numeral 36 denotes a one-way clutch (OWC1).

The main transmission 4 comprises a front-stage planetary gear mechanism 400 and a rear-stage planetary gear mechanism 410.

The front-stage planetary gear mechanism 400 comprises three gear elements consisting of a sun gear 401, a pinion gear 402 and a ring gear 403 and a planetary carrier 404, while the rear-stage planetary gear mechanism 410 comprises three gear elements consisting of a sun gear 411, a pinion gear 412 and a ring gear 413 and a planetary carrier 414. The sun gear 401 of the front-stage planetary gear mechanism 400 is connected to the sun gear 411 of the rear-stage planetary gear mechanism 410.

The output shaft 3a of the sub-transmission 3 is connected through a second clutch 41 (C2) to the sun gear 401 of the front-stage planetary gear mechanism 400, on the one hand, and to the sun gear 411 of the rear-stage planetary gear mechanism 410, on the other hand. Further, the output shaft 3a is connected to the ring gear 403 of the front-stage planetary gear mechanism 400. On the other hand, an output shaft 4a of the main transmission 4 is connected to the planetary carrier 404 of the front-stage planetary gear mechanism 400 and to the ring gear 413 of the rear-stage planetary gear mechanism 410. The main transmission 4 has three brakes secured to the casing 5 of the sub-transmission 3, i.e. second brake 43 (B2), third brake 44 (B3) and fourth brake 45 (B4). By switching these friction elements, i.e. second, third and fourth brakes 43, 44 and 45 as well as the clutches 41 and 42, the main transmission 4 assumes three forward speed range modes and one rearward speed range mode. As shown in FIG. 3, reference numerals 46 and 47 denote one-way clutches (OWC2 and OWC3), respectively.

Table 1 shows the relationship of the modes assumed by switching the coupling or uncoupling between the brakes 43-45 and the clutches 41 and 42 with the speed range modes realized by the main transmission 4. Further, as shown in Table 1, the automatic transmission AT is so arranged as to assume five forward speed range modes by combining the speed range mode to be assumed by the main transmission 4 with the speed range mode to be assumed by the sub-transmission 3.

In other words, the first speed range is realized by the sub-transmission 3 assuming a low speed range and the main transmission 4 assuming a low speed range. The second speed range is realized by the sub-transmission 3 assuming a high speed range yet by the main transmission 4 assuming a low speed range. The third speed range is realized by the sub-transmission 3 assuming a low speed range and the main transmission 4 assuming an intermediate speed range. Further, the fourth speed range is realized by the sub-transmission 3 assuming a low speed range yet by the main transmission 4 assuming a high speed range. Furthermore, the fifth speed range is realized by the sub-transmission 3 assuming a high speed range and the main transmission 4 assuming a high speed range.

TABLE 1

| Speed Range Modes | Sub-Transmission | | | Main Transmission | | | | | | | Speed Ranges |
|---|---|---|---|---|---|---|---|---|---|---|---|
| | C1 | B1 | OWC1 | C2 | C3 | B2 | B3 | B4 | OWC2 | OWC3 | |
| 1st | ○ | | ○ | ○ | | (○) | | | ○ | | Low |
| 2nd | | ○ | | ○ | | (○) | | | ○ | | Low |
| 3rd | ○ | | ○ | ○ | ○ | | | ○ | | | Intermediate |
| 4th | ○ | | ○ | ○ | ○ | ⓒ | | | | | High |
| 5th | | ○ | | ○ | ○ | ⓒ | | | | | High |
| Rev | ○ | | ○ | ○ | | | | ○ | | ○ | Reverse |

Notes.
Round parentheses ( ) means coupling when the engine is braked.
Double circles ⓒ means coupling yet involving no transmission of power due to free-coupling of the one-way clutches (OWC).

Figure 4:
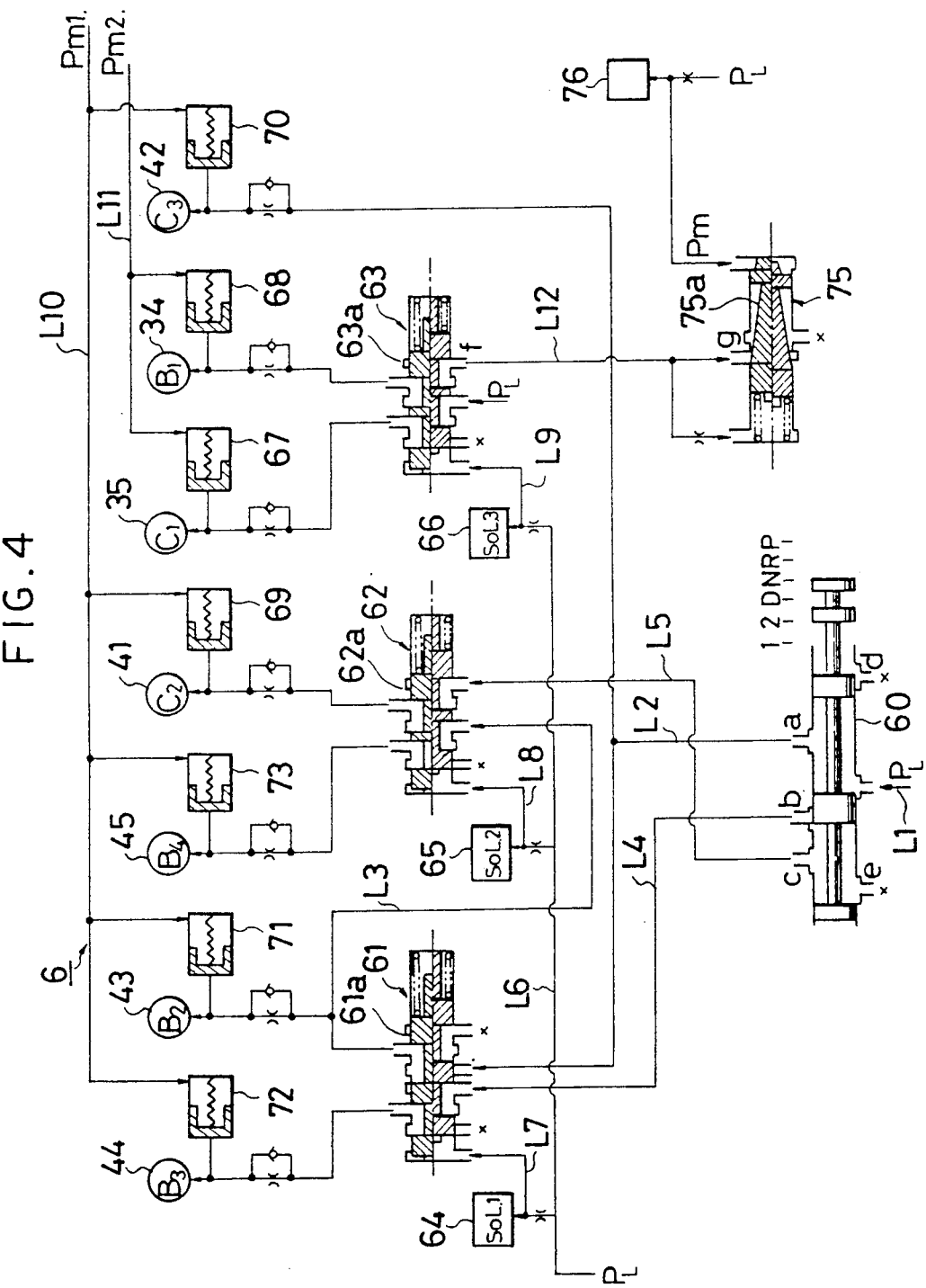
FIG. 4 is a circuit diagram showing a hydraulic circuit of the automatic transmission according to the embodiment of the present invention.

As shown in FIG. 4, the automatic transmission AT is provided with a hydraulic pressure circuit 6. In FIG. 4, reference numeral 60 denotes a select valve to which operating oil $P_L$ is led through a pressure line L1 after adjustment of the pressure thereof. The select valve 60 is so arranged as to assume select positions "1", "2", "D", "N", "R" and "P". The select valve 60 is further provided with three supply ports a, b and c so disposed as to communicate with the pressure line L1 for supplying hydraulic pressure, when it assumes one of these positions, and with two drain ports d and e. More specifically, when the position "R" is selected, the pressure line L1 is communicated with the supply ports b and c. Further, when the position "1" or "2" is selected, the pressure line L1 is communicated with the supply ports a and b. And the pressure line L1 is communicated with the supply port a when the position "D" is selected.

A pressure line L2 communicated with the supply port a is connected to the third clutch 42 (C3) and to the second brake 43 (B2) through a first shift valve 61. A pressure line L3 connected to the first shift valve 61 is connected through a second shift valve 62 to a fourth brake 45 (B4) and a second clutch 41 (C2).

To the supply port b is connected a pressure line L4 which in turn is connected through the first shift valve 61 to the third brake 44 (B3). To the supply port c is connected a pressure line L5 which in turn is connected through the second shift valve 62 to the second clutch 41 (C2).

The operating oil $P_L$ is alternatively led through a third shift valve 63 to the first clutch 35 (C1) and the first brake 34 (B1) of the sub-transmission 3.

Further, the operating oil $P_L$ can be led to the left ends of the shift valves 61, 62 and 63 through branch pressure lines L7, L8 and L9, respectively, branched off from a pressure line L6. The branch pressure line L7 is provided with a first solenoid valve 64, the branch pressure line L8 is provided with a second solenoid valve 65, and the branch pressure line L9 is provided with a third solenoid valve 66. Each of the solenoid valves 64, 65 and 66 is a shift valve capable of being shifted between its ON and OFF states. When the first solenoid valve 64 is opened, the operating oil $P_L$ is supplied to the left end of the first solenoid valve 61 to move a spool 61a thereof to the right in the drawing, thereby allowing the operating oil $P_L$ to be supplied to the third brake 44 (B3) and, as a consequence, the automatic transmission AT to assume speed range modes "1", "2" and "R". On the other hand, when the first solenoid valve 64 is closed, the spool 61a of the first shift valve 61 is allowed to move to the left in the drawing, thereby supplying the operating oil $P_L$ from the pressure line L2 to the second brake 43 (B2). Further, the operating oil $P_L$ can be supplied through the pressure line L3 and the second shift valve 62 to the fourth brake 45 (B4) and to the second clutch 41 (C2), thereby allowing the automatic transmission AT to assume speed range modes "3", "4" and "5".

When the second solenoid valve 65 is opened, the operating oil $P_L$ is supplied to the left end of the second shift valve 62 and the spool 62a of the second shift valve 62 is moved to the right in the drawing, thereby allowing the operating oil $P_L$ to be supplied from the pressure line L3 to the fourth brake 45 (B4) and the operating oil $P_L$ from the pressure line L5 to the second clutch 41 (C2). This arrangement allows the automatic transmission AT to assume speed range modes "1", "2", "3" and "R". On the other hand, when the second solenoid valve 65 is closed, the spool 62a of the second shift valve 62 is moved to the left in the drawing, thereby allowing the operating oil $P_L$ from the pressure line L3 to be supplied to the second clutch 41 (C2) and consequently the automatic transmission AT to assume speed range modes "4" and "5".

Further, when the third solenoid valve 66 is opened, the operating oil $P_L$ is supplied to the left end of the third shift valve 63, thereby moving a spool 63a of the third shift valve 63 to the right in the drawing and allowing the operating oil $P_L$ to be supplied to the first clutch 35 (C1). This allows the automatic transmission AT to assume speed range modes "2" and "5". On the other hand, when the third solenoid valve 66 is closed, the spool 63a of the third solenoid valve 66 is moved to the left in the drawing, thereby supplying the operating oil $P_L$ to the first brake 34 (B1). This allows the automatic transmission AT to assume speed range modes "1", "3", "4" and "R".

The relationship between each of the speed range modes and the solenoid valves 64, 65 and 66 is shown in Table 2, in which reference symbol "SOL1" denotes the first solenoid valve 61, reference symbol "SOL2" denotes the second solenoid valve 62, and reference symbol "SOL3" denotes the third solenoid valve 63.

TABLE 2

| | SOL 1 | SOL 2 | SOL 3 |
|---|---|---|---|
| 1st | X | X | X |
| 2nd | X | X | ○ |
| 3rd | ○ | X | X |
| 4th | ○ | ○ | X |
| 5th | ○ | ○ | ○ |
| Rev | X | X | X |

Notes:
○ means open.
X means closed.

Figure 5:
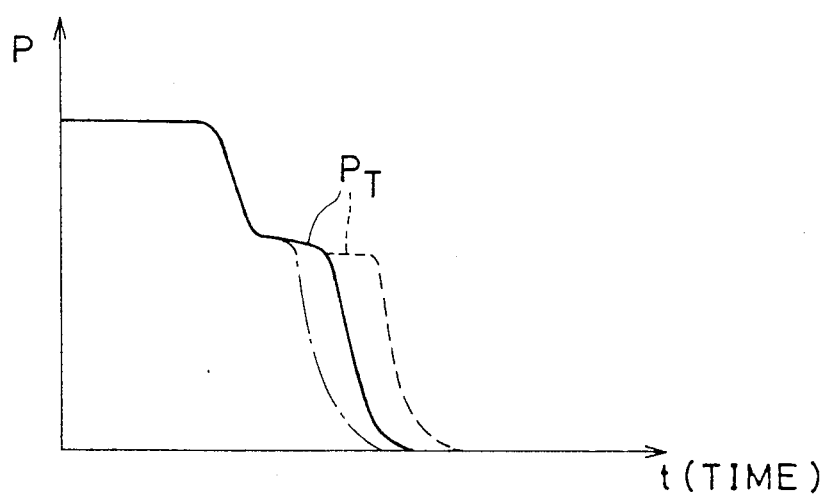
FIG. 5 is a graph showing the relationship between the fall of the pressure for releasing the first brake as a friction element of the sub-transmission and the pilot pressure to be supplied to the drain valve for controlling the pressure for releasing the friction element.

Each of the pressure lines for supplying or discharging the operating oil, which are connected directly to each of the friction elements, is provided with an accumulator 67, 68, 69, 70, 71, 72 and 73. To each of the accumulators 69 to 73 for the main transmission 4 is supplied modulator pressure Pm1 as back pressure through a pressure line L10, while modulator pressure Pm2 as back pressure is supplied through a pressure line L11 to the accumulators 67 and 68 for the sub-transmission 3. The adjustment of the modulator pressure Pm1 and Pm2 can control the rise of the pressure to be supplied to each of the friction elements 34, 35 and 41 to 45 and the extent to which the pressure is released therefrom. For instance, as shown in FIG. 5, a lag $P_T$ which may appear in the course of releasing the hydraulic pressure from the first brake 34 (B1) can be adjusted so as to be rendered smaller by making the modulator pressure Pm2 larger, as indicated by the phantom line in FIG. 5, and to be rendered larger by making the modulator pressure Pm2 smaller, as indicated by the broken line in FIG. 5. Thus, the time required for shifting the friction elements 34 and 35 of the sub-transmission 3 can be adjusted.

To the drain port f for the first brake 34 of the third shift valve 63 is connected a drain line L12 which in turn is connected to the port g of a drain valve 75. The drain valve 75 has a movable valve member 75a capable of linearly adjusting the effective opening area of the drain port g thereof, and the movable valve member 75a is so arranged as to move to the left, as shown in the drawing, by pilot pressure Pm to be supplied to the right end of the drain valve 75. As the movable valve member 75a moves toward the left, the effective opening area of the drain port g of the drain valve 75 becomes gradually larger. The pilot pressure Pm is controlled by a linear solenoid valve or a duty solenoid valve 76, thereby controlling a flow of the drain of the first brake 34.

A shift of the automatic transmission AT can be controlled by a control unit (not shown) composed of a microcomputer or the like. The control unit has a variety of data required for control of the shift of the automatic transmission AT so as to upshift and downshift the automatic transmission AT. In other words, for instance, the control unit generates upshift signals or downshift signals to the solenoid valves 61, 62 and 63 by collating upshifting and downshifting lines of a shift map on the basis of the shift map predetermined from a vehicle speed and a load of the engine. It is to be noted that the control of the shift in this manner is known per se so that further description thereon will be omitted from the following explanation.

Signals from sensors 80, 81 and 82 (FIG. 3) are inputted into the control unit. The sensor 80 is to sense the number of rotations (NT) of the turbine 21. The sensor 81 is to sense the number of rotations (N1) to be transmitted to the output shaft 3a from the sun gear 30 of the sub-transmission 3. The sensor 82 is to sense the number of rotations (No) to be transmitted to the sun gears 401 and 411 of the main transmission 4 from the output shaft 3a of the sub-transmission 4.

When both of the main transmission 4 and the sub-transmission 3 upshift or downshift at the same time, the control unit performs the control of an upshift or a downshift of the main transmission 4 and the sub-transmission 4 as follows.

Figure 6:
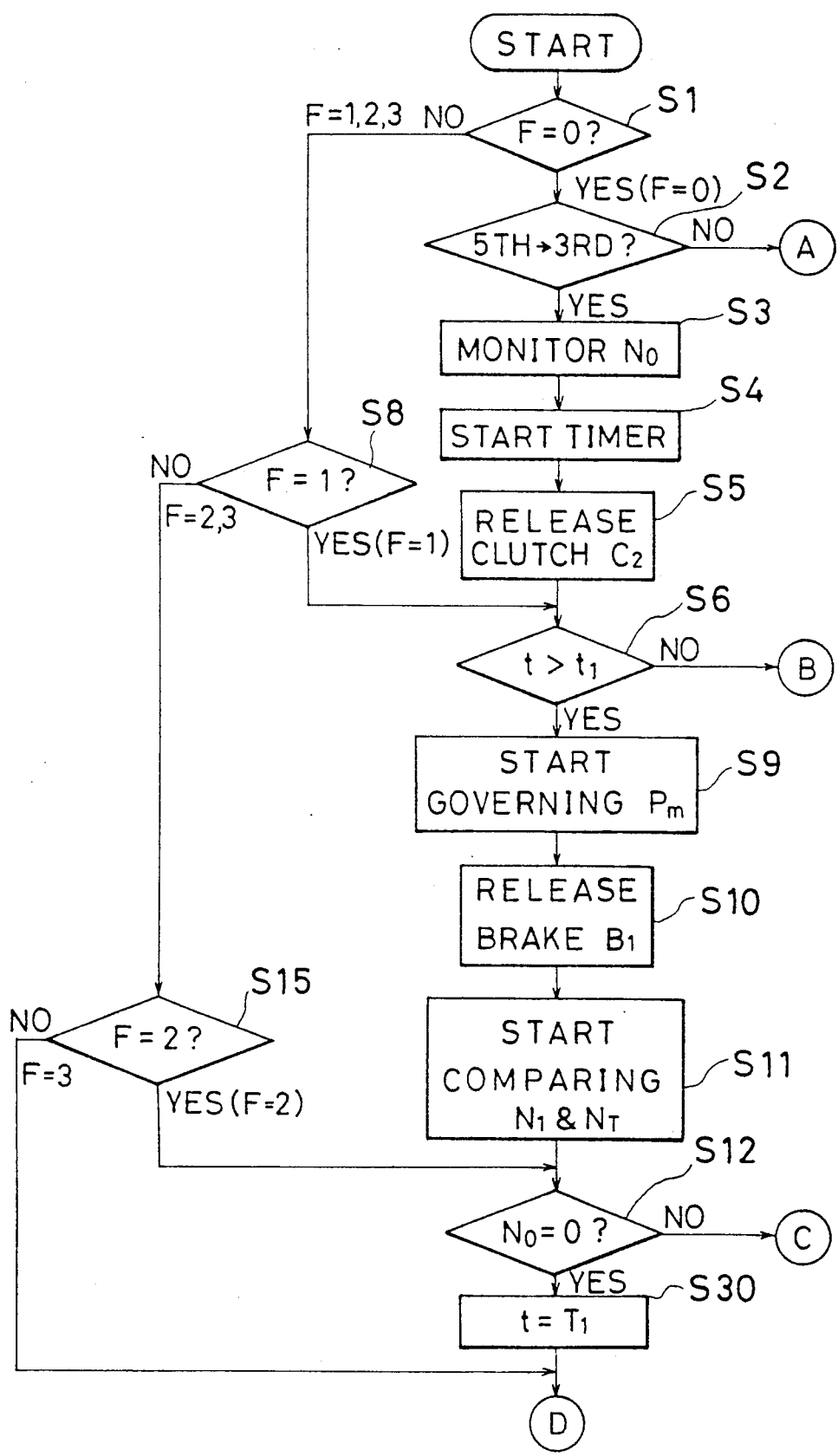
FIGS. 6 and 7 are flowcharts showing an example for control of the downshift from the fifth speed range mode to the third speed range mode.
Figure 7:
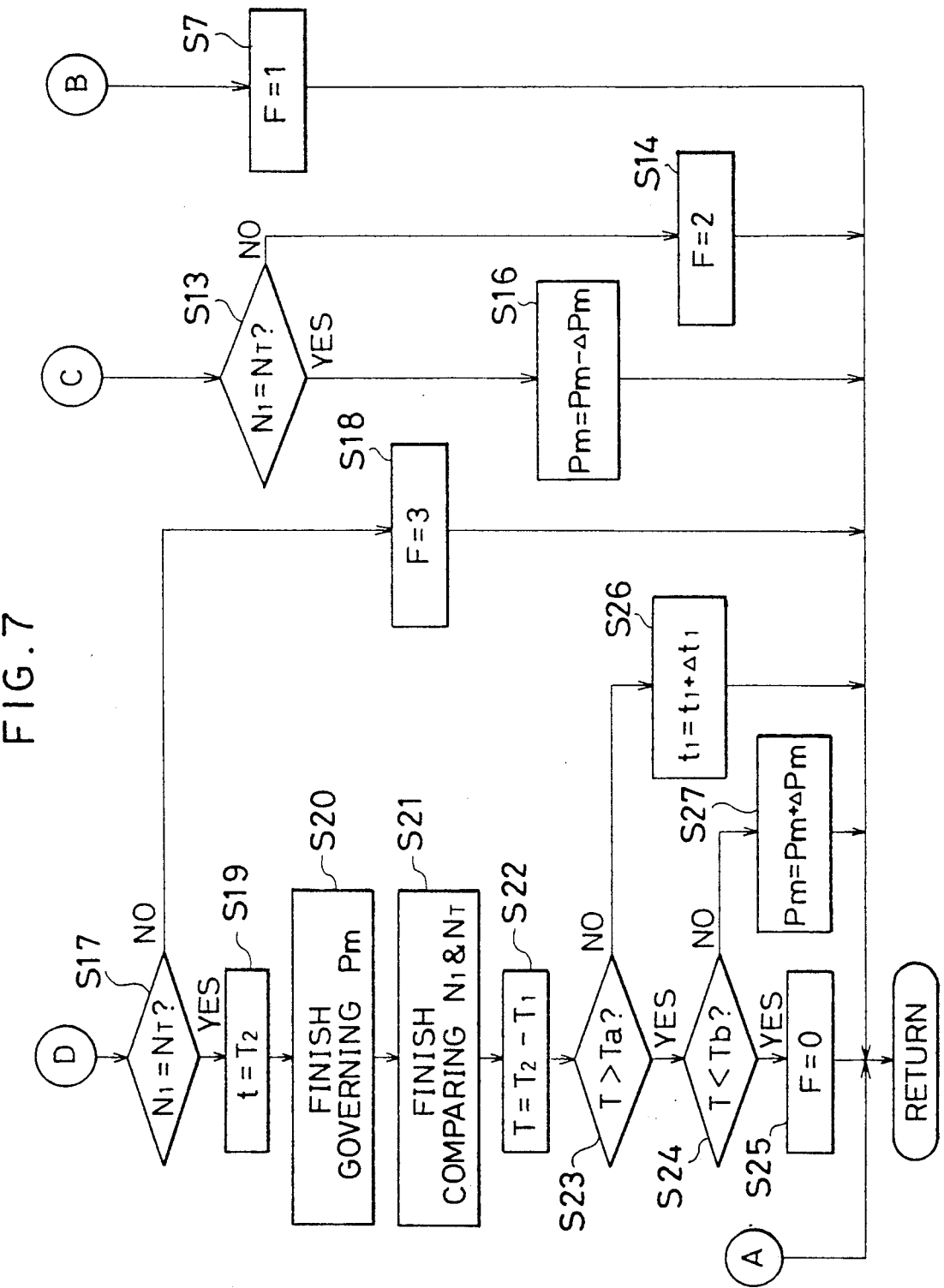

For instance, when both of the main transmission 4 and the sub-transmission 3 downshift, the shift from the speed range mode "5" to the speed range mode "3" and from the speed range mode "5" to the speed range mode "1" correspond to this case, as shown in Table 1 above. Description will be made of the shift from the speed range mode "5" to the speed range mode "3" as a representative example, with reference to the flowcharts as shown in FIGS. 6 and 7.

Figure 1:
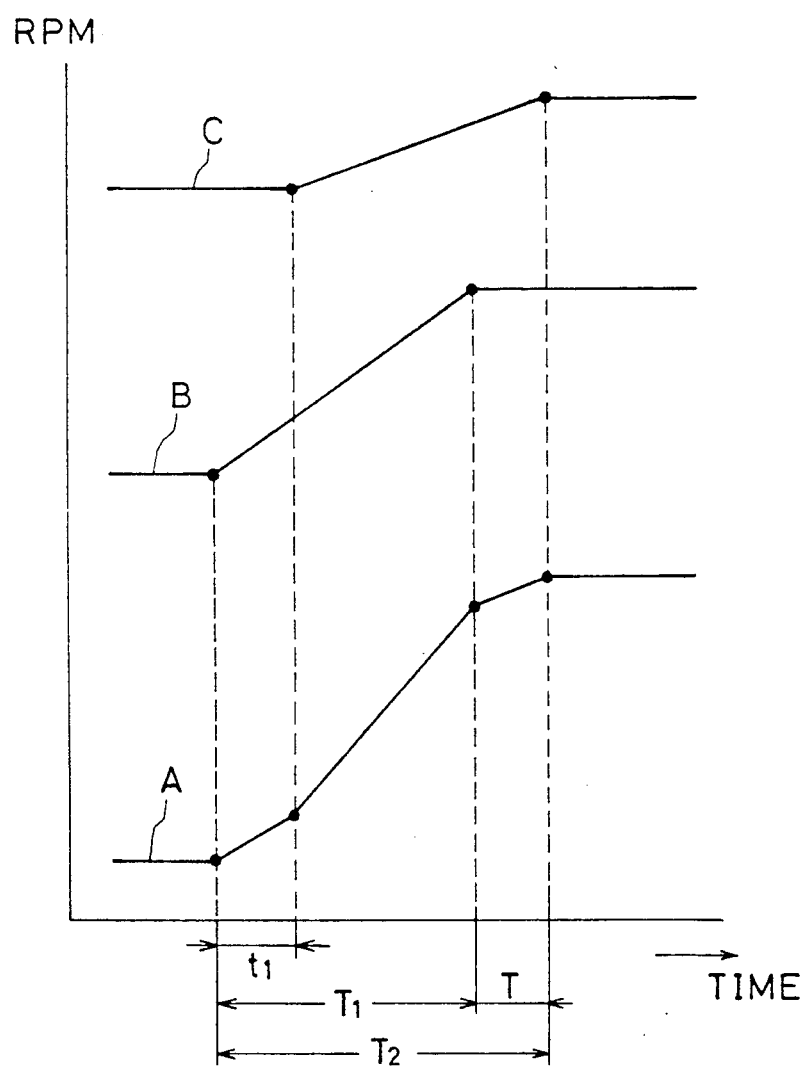
FIG. 1 is a timing chart showing the action of the embodiment according to the present invention.

The downshift from the speed range mode "5" to the speed range mode "3" is performed by having sub-transmission 3 exist in its low speed range mode by coupling the first clutch 35 (C1) and uncoupling the first brake 34 (B1). Hence, when the downshifting of the sub-transmission 3 has been finished, the output shaft 2a of the torque converter 2 is caused to be coupled directly to the output shaft 3a of the sub-transmission 3, thereby making the rotational number NT detected by the sensor 80 equal to the rotational number No detected by the sensor 81. On the other hand, this downshift is performed when the main transmission 4 assumes an intermediate speed range mode by uncoupling the second clutch 41 (C2), maintaining the coupled state of the second brake 43 (B2) and coupling the one-way clutch 47 (OWC3). Hence, as the downshifting of the main transmission 4 has been finished, the rotational number No detected by the sensor 82 becomes zero by the action of the one-way clutch 47. A summary of the control to be performed herein is such that, as a gear ratio of the sub-transmission 3 is smaller than a gear ratio of the main transmission 4, the main transmission 4 is downshifted prior to the sub-transmission 3 so that the timing for finishing the downshifting of the sub-transmission 3 is delayed from the timing for finishing the downshifting of the main transmission 4, as shown in the timing chart in FIG. 1. In FIG. 1, reference symbol A stands for the number of rotation (NT) of the turbine 21, reference symbol B for the rotational number on the input side (3a) of the main transmission 4, and reference symbol C for the rotational number on the input side (2a) of the sub-transmission 3.

Given the foregoing, the contents of the flow charts will be described in detail with reference to FIGS. 6 and 7.

First, at step S1, a decision is made to determine if a flag F is zero. When the result of decision at step S1 indicates that the flag F is set to zero, then the program flow goes to step S2 at which a decision is further made to determine if there is an instruction for performing a shift from the speed range mode "5" to the speed range mode "3". If it is decided at step S2 that the instruction for performing the shift from the fifth speed range mode to the third speed range mode is given, then the program flow goes to step S3 at which the sensor starts monitoring the rotational number (No), followed by proceeding to step S4 at which a timer starts up and then proceeding to step S5 at which an instruction is given for uncoupling the second clutch 41 (C2) to downshift the main transmission 4. After the instruction for uncoupling the second clutch 41 (C2) has been given at step S5, the program flow goes to step S6 at which a decision is made to determine if the time $t_1$ is elapsed (as shown in FIG. 1), i.e. if the time t is longer than the time $t_1$. When the result of decision at step S6 indicates that the time t is equal to or shorter than the time t1, then the program flow goes to step S7 at which the flag F is set to 1, followed by the return of the flow to step S6 through steps S1 and S8. It is to be noted herein that the setting of the flag F to one means that the downshifting of the main transmission 4 has started. When it is decided at step S6 that the time t1 has been elapsed after the instruction for releasing the second clutch 41 (C2)

has been given, then the program flow goes to step S9 at which the adjustment of the pilot pressure Pm for the drain valve 75 starts. In other words, the solenoid valve 76 is operated to govern the pilot pressure for the drain valve 76. Then, at step S10, an instruction is given for releasing the first brake 34 (B1), thereby starting downshifting the sub-transmission 3, followed by proceeding to step S11 at which the rotational number N1 is compared with the rotational number NT.

Then, at step S12, a decision is made to determine if the rotational number No is zero, i.e. if the downshifting of the main transmission 4 has been finished. When the result of decision at step S12 indicates that the rotational number No is not zero, then the program flow goes to step S13 at which a decision is further made to determine if the rotational number N1 is equal to the rotational number NT. When it is decided at step S13 that the rotational number N1 is greater than or smaller than the rotational number NT, then the program flow goes to step S14 at which the flag F is set to two, followed by the return to the step S12 through the steps S1, S8 and S15. It is to be noted herein that the setting of the flag F to two means that the downshifting of the main transmission 4 has not yet been finished. If it is decided at step S13 that the rotational number N1 is equal to the rotational number NT, i.e. if it is decided that the downshifting of the sub-transmission 3 has already been finished, it means that the sub-transmission 3 has finished downshifting even if the downshifting of the main transmission 4 has not yet been finished, so that the program flow goes to step S16 at which the pilot pressure Pm is reduced by a predetermined pressure ($\Delta$Pm). Then, the resulting pilot pressure Pm is stored as a learning value for the pilot pressure for a shift which follows next.

When it is decided at step S12 that the rotational number No is zero, i.e. it is decided that the downshifting of the main transmission 4 has been finished, then the program flow goes to step S30 at which the time T1 is read (as shown in FIG. 1), followed by proceeding to step S17 at which a decision is made to determine if the rotational number N1 is equal to the rotational number NT. When the result of decision at step S17 indicates that the rotational number N1 is greater than or smaller than the rotational number NT, then the program flow goes to step S18 as the downshifting of the sub-transmission 3 is not yet finished. Then, at step S18, the flag F is set to F=3 and then by the return to step S17 through the steps S1, S8 and S17. It is to be noted herein that the setting of the flag F to three means that the downshifting of the sub-transmission 3 is not yet finished although the downshifting of the main transmission 4 has been finished. When it is decided at step S17 that the rotational number N1 is equal to rotational number NT, then the program flow goes to step S19 as the finish of the downshifting of the sub-transmission 3. At step S19, the time T2 (as shown in FIG. 1) is read, followed by step S20 at which the governing of the pilot pressure is finished and by step S21 at which the comparison of the rotational number N1 with the rotational number NT is finished. Then, at step S22, operation is made by subtracting the time T1 from the time T2. Then, at steps S23 and S24, it is decided to determine if the time T is larger than the time Ta and smaller than the time Tb, respectively. If the results of decisions at steps S23 and S24 indicate that the time T exists in a predetermined range, i.e. Ta<T<Tb, then the program flow goes to step S25 at which the flag F is reset to zero. When it is decided at step S23 that the time T is equal to or smaller than the time Ta, then the program flow goes to step S26 as the timing for finishing the downshift of the sub-transmission 3 is too early with respect to the downshifting of the main transmission 4, followed by proceeding to step S26 at which the time t1 for setting the timing for starting the shift of the sub-transmission 3 is delayed by a predetermined period of time ($\Delta$t1). The resulting time t1 is then stored as a learning value for the timing for starting the shift of the sub-transmission 3 for performing the subsequent shift. On the other hand, it is decided at step S24 that the time T is equal to or larger than the time Tb, then the program flow goes to step S27 at which the pilot pressure Pm is increased by a predetermined value ($\Delta$Pm) as the timing for finishing the shift of the sub-transmission 3. The resulting pilot pressure Pm is stored as a learning value for the pilot pressure for next shift.

In the control of downshifting from the fifth speed range mode to the third speed range mode in the manner as described hereinabove, a rate of changes in the rotational number of the automatic transmission AT becomes small immediately before the finish of the shift of the automatic transmission AT, as is apparent from the variation in the rotational number of the turbine as shown as "A" in FIG. 1, because the timing for finishing the shift of the sub-transmission 3 having a relatively smaller gear ratio is delayed rather than the timing for finishing the shift of the main transmission 4. Hence, in instances where the sub-transmission 3 and the main transmission 4 are both downshifted, a shock caused by the shift can be minimized. Further, in this embodiment, the period of time T ranging from the finish of the shift of the main transmission 4 to the finish of the shift of the sub-transmission 3, etc. is learned, thereby preventing the problems from occurring, which may occur as a shift shock in two stages due to a too long period of time T or which may occur as elimination of the effect of reducing the shift shock on the side of the automatic transmission AT due to a too short period of time T.

It is to be noted that, although in the aforesaid embodiment the sub-transmission 3 is so arranged as to delay its timing for finishing the shift from the timing of the main transmission 4 for finishing its shift, it is also possible to delay the timing for finishing the shift of the main transmission 4 from the timing for finishing the shift of the sub-transmission 3.

It is also possible to dispose the sub-transmission 3 in a position rearward of the main transmission 4 although the sub-transmission 3 is disposed in the position forward of the main transmission 4 in the embodiment as described hereinabove.

It is to be noted, however, that the embodiments as described hereinabove are preferred when taken the effects of suppressing the vehicle speed from changing at the time of finishing the shift and eliminating the influence of inertia into consideration.

It is to be understood that the foregoing text and drawings relate to embodiments of the present invention given by way of examples but not limitation. Various other embodiments and variants are possible within the spirit and scope of the present invention.

What is claimed is:

1. A method for controlling a shift of an automatic transmission for an automotive vehicle having a plurality of shift mechanisms disposed sequentially for realizing a speed range mode in a multistage transmission by appropriately combining the plurality of shift mechanisms, wherein when at least two shift mechanisms are both downshifted or upshifted, a time of finishing of the downshifting or upshifting of one shift mechanism is sequentially delayed relative to a time of finishing of the downshifting or upshifting of the other shift mechanism.

2. A method for controlling a shift as claimed in claim 1, wherein the one shift mechanism has a larger gear ratio than the other shift mechanism and said step of sequentially delaying the time of finishing downshifting or upshifting is performed such that the one shift mechanism with the larger gear ratio finishes shifting before the other shift mechanism.

3. A method for controlling a shift as claimed in claim 1, further comprising computing an optimum value for the timing between when the one shift mechanism ends downshifting or upshifting and the other shift mechanism ends downshifting or upshifting.

4. A method for controlling a shift as claimed in claim 1, further comprising sequentially beginning the downshifting or upshifting of the one shift mechanism relative to the other shift mechanism.

5. A method for controlling a shift as claimed in claim 1, wherein each of the plurality of the shift mechanisms comprises friction elements comprising a planetary gear mechanism and the method further comprises shifting the shift mechanisms by coupling or uncoupling the friction elements.

6. A method for controlling a shift as claimed in claim 1, wherein the plurality of shift mechanisms comprise two shift mechanisms.

7. A method for controlling a shift as claimed in claim 6, wherein one of the two shift mechanisms comprises a sub-transmission having a low speed range mode and a high speed range mode and the other of the shift mechanisms comprises a main transmission having a low speed range mode, an intermediate speed range mode and a high speed range mode.

8. A shift control system for an automatic transmission of an automotive vehicle having a plurality of shift mechanisms so disposed sequentially as to realize a speed range mode in a multistage transmission by appropriately combining the plurality of the shift mechanisms, comprising:
means for detecting a shift in an identical direction in which at least two shift mechanisms are downshifted or upshifted; and
means for sequentially delaying a time of finishing a shift of one shift mechanism relative to a time for finishing downshifting or upshifting of the other shift mechanism in response to a signal from the means for detecting the shift in the identical direction, when at least two shift mechanisms are downshifted or upshifted.

9. A shift control system as claimed in claim 8, wherein the one shift mechanism has a larger gear ratio then the other shift mechanism and the means for sequentially delaying includes finishing the shift of the one shift mechanism before the other shift mechanism 10. A shift control system as claimed in claim 8, further comprising means for sequentially beginning the downshifting or upshifting of the one shift mechanism relative to the other shift mechanism.

11. A shift control system as claimed in claim 8, wherein each of the plurality of the shift mechanisms comprises friction elements including a planetary gear mechanism and said system further comprises a means for coupling or uncoupling the friction elements.

12. A shift control system as claimed in claim 11, wherein the plurality of the shift mechanisms comprises two shift mechanisms.

13. A shift control system as claimed in claim 12, wherein one of the shift mechanisms comprises a sub-transmission having a low speed range mode and a high speed range mode, and the other shift mechanism comprises a main transmission having a low speed range mode, an intermediate speed range mode and a high speed range mode.

14. A shift control system as claimed in claim 13, wherein the sub-transmission and the main transmission are disposed sequentially and the sub-transmission is disposed on the side of a combustion engine and the main transmission is disposed on the side of driven wheels.

15. A shift control system as claimed in claim 14, wherein the means for sequentially delaying the shift, delays the finishing of the shift of the sub-transmission from the finishing of the shift of the main transmission.

16. A shift control system as claimed in claim 15, wherein the means for sequentially delaying the shift, delays the finishing of the shift of the sub-transmission from the finishing of the shift of the main transmission by delaying the starting of the shift of the sub-transmission relative to the starting of the shift of the main transmission.

17. A shift control system as claimed in claim 15, further comprising means for adjusting a delay time for adjusting the timing for finishing the shift of the sub-transmission.

18. A shift control system as claimed in claim 17, wherein the means for adjusting the delay time adjusts the timing for finishing the shift of the sub-transmission by delaying the starting of the shift of the sub-transmission when the finishing of the shift of the sub-transmission is too early.

19. A shift control system as claimed in claim 17, wherein the means for adjusting the delay time adjusts the finishing of the delay of the sub-transmission by advancing the finishing of the shift of the sub-transmission when the timing for finishing the shift of the sub-transmission is too late.

20. A shift control system as claimed in claim 17, further comprising learning means for learning the timing for finishing the shift of the sub-transmission; wherein the means for adjusting the delay time adjusts the finishing of the shift of the sub-transmission of the basis of said learning means.

* * * * *